(12) United States Patent
Jain et al.

(10) Patent No.: US 7,640,532 B2
(45) Date of Patent: Dec. 29, 2009

(54) MAPPING SOFTWARE CODE TO BUSINESS LOGIC

(75) Inventors: Prashant Jain, Delhi (IN); Ravi Kothari, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/925,630

(22) Filed: Aug. 25, 2004

(65) Prior Publication Data

US 2006/0048093 A1    Mar. 2, 2006

(51) Int. Cl.
    *G06F 9/44* (2006.01)
(52) U.S. Cl. .................. 717/102; 717/106; 717/123
(58) Field of Classification Search .................. 717/104
    See application file for complete search history.

(56) References Cited

U.S. PATENT DOCUMENTS 6,253,370 B1    6/2001   Abadi et al.
6,424,948 B1 *  7/2002   Dong et al. ..................... 705/9
6,546,364 B1 *  4/2003   Smirnov et al. ................ 703/22
2002/0198873 A1 * 12/2002 Chu-Carroll ................... 707/3
2004/0154000 A1 *  8/2004 Kasravi et al. .............. 717/130
2005/0256818 A1 * 11/2005 Sun et al. ...................... 706/46

OTHER PUBLICATIONS

Gavin et al, Business Integration Management using WebSphere BI Modeler and Monitor: A real world case study, Mar. 2004, [retrieved on Jul. 23, 2009] Retrieved from the Internet:URL<http://www.redbooks.ibm.com/redbooks/pdfs/sg247024.pdf.*
WebSphere Business Modeler: http://www-01.ibm.com/software/integration/wbimodeler/library/60x.html [retrieved on Jul. 23, 2009].*

* cited by examiner

*Primary Examiner*—Tuan Q Dam
*Assistant Examiner*—Cheneca P Smith
(74) *Attorney, Agent, or Firm*—Gibb I.P. Law Firm, LLC

(57) ABSTRACT

A connection is established between the source code and the business requirements of a software system. User specified keyword that reflect business requirements are expanded using an ontology and a thesaurus. The augmented list of user specified keywords are matched to the automatically annotated source code. The results of the match along with call graph of the source code are used to generate workflows that provide a mapping from the source code to business logic.

17 Claims, 4 Drawing Sheets

MAPPING SOFTWARE CODE TO BUSINESS LOGIC

FIELD OF THE INVENTION

The present invention relates to mapping software code to business logic.

BACKGROUND

The development, deployment and subsequent customization cost of even moderately complex software is high. In many situations, the total cost of ownership may significantly exceed the product price. One of the primary contributors to the high cost of development and ownership is the numerous and complex inter-dependencies that exist in such software. These interdependencies make it hard to know what to change to achieve a given business objective.

A fundamental issue that gives rise to this problem is lack of adequate documentation. Documentation is almost always incomplete, inadequate, outdated, disconnected and almost always not related to the actual code that gets executed. Numerous tools attempt to address the issue of documentation by facilitating capture of business requirements, design model and source code documentation. However, what is missing is a means to map and connect the source code to the business requirements. The goal of this invention is to create a mapping from the source code to business logic.

One notable reference is U.S. Pat. No. 6,253,370 issued Jun. 26, 2001 to Abadi, et al. and entitled "Method and apparatus for annotating a computer program to facilitate subsequent processing of the program". This publication describes annotating a computer program for subsequent analysis in a different computer system. The annotations relate to execution flow of the code, and the subsequent analysis detects unauthorized or inappropriate operations. Accordingly, any inappropriate code can be rejected before its execution.

Notwithstanding this existing art, a need exists for an improved manner of analyzing code and produce an output that is more closely associated with business requirements.

SUMMARY

A nexus can be established between computer source code and the business requirements or business logic of a software system. A summary of the dependencies between modules of the source code is first established to yield a call graph, the results of which are then used to perform a semantic analysis of the code. The semantic analysis of the code is used as a basis for mapping code segments to business requirements.

Given a set of keywords that identify a business requirement, one is able to derive one or more workflows that correspond to the keywords. A workflow identifies a sequence of interactions among the source code classes and methods. In particular, a workflow includes a source and a sink that can help to identify a source code trace corresponding to a particular business requirement. The source and sink are originating and terminating modules of the source code, respectively.

Once such workflows are associated with a corresponding business requirement, one can understand the inter-dependencies in the software system, and also ease enhancement and customization of the software system.

DETAILED DESCRIPTION

The techniques described herein map computer program source code to "business logic", which is used interchangeably with the term "business requirements". One or more workflows are generated given a set of keywords, which are typically words used in a business context to indicate particular aspects of business procedure, protocol, and so on. An object-oriented paradigm is used in the example described herein.

A workflow is defined as a sequence of interactions among the source code modules, typically classes and methods. A workflow includes a source and a sink that can help identify a trace through the code. The derived workflows provide a direct mapping from the source code to the business logic identified by the keywords.

Three inputs are used to derive workflows: (i) annotated source code, (ii) a source code call graph that depicts the various dependencies between the software modules, and (iii) business logic keywords.

Figure 1:
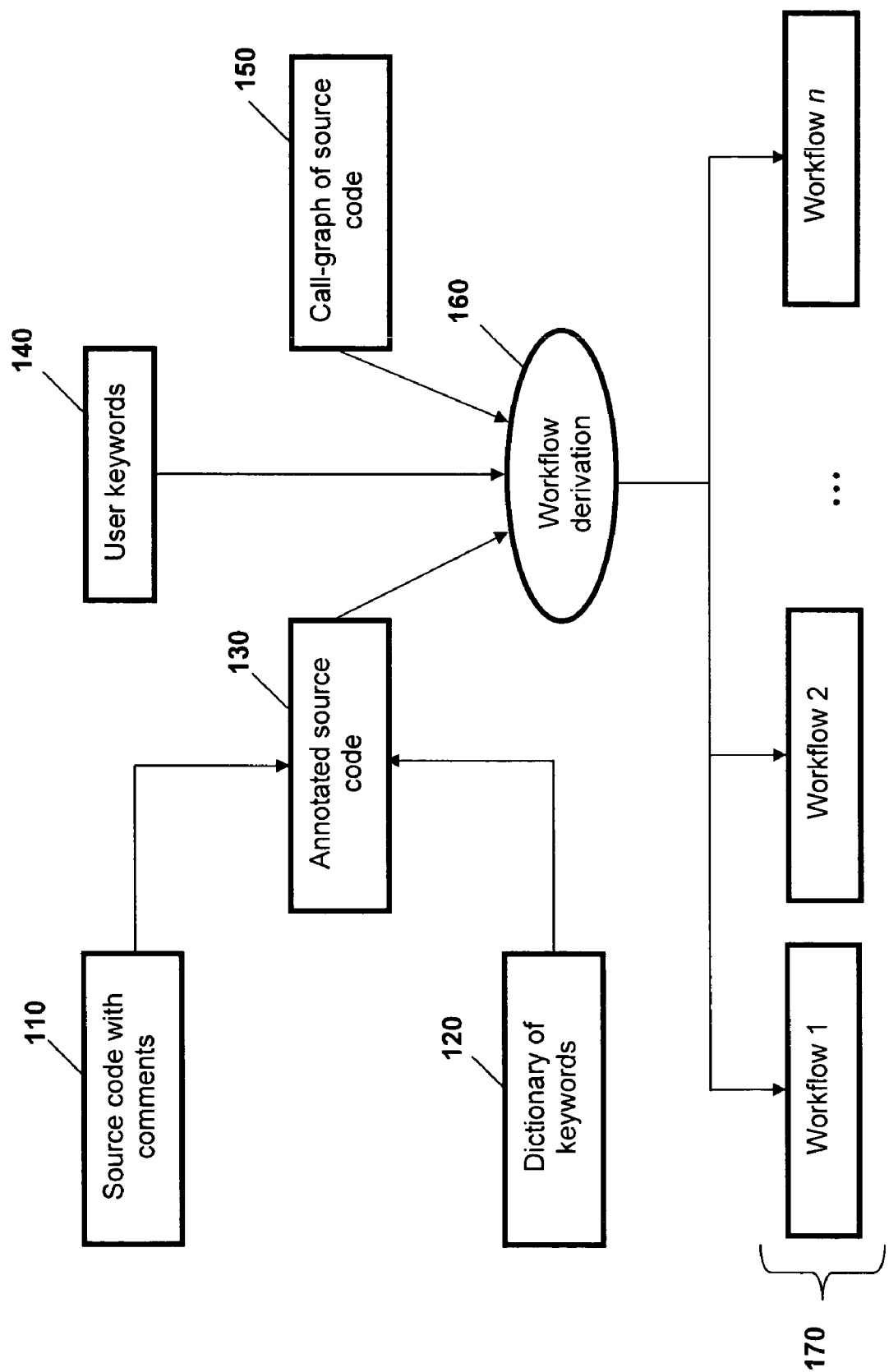
FIG. 1 is a schematic representation of how workflows are derived for semantic code analysis.

FIG. 1 depicts the process of deriving workflows using the inputs noted above. Commented source code 110, and a keyword dictionary 120, combine to produce annotated source code 130. User keywords 140, and a call graph of the source code 150, combine with the annotated source code 130 to contribute to the workflow derivation 160. As a consequence, a number of different workflows n 170 are produced, as described in further detail herein. The workflows 170 are derived from the source code call graph 150. Workflows 170 represent unique directed paths in the call graph 150.

The source code of the software system is annotated in a two-step process. A first step involves the dictionary of keywords 120, which is used to annotate the source code 110. The dictionary of keywords 120 includes a listing of predetermined keywords, which is constructed manually in advance. The keywords are indicative of a typical search vocabulary of a representative business logic.

Keywords 120 provide the association between code 110 and business language. For example, a keyword may be "Order" which has a specific meaning in a business context.

Code 110 may have a method called "OrderUpdate". The "OrderUpdate" method can then be associated with the business concept called "Order." Similarly, comments embedded in the source code 110 or any other separate piece of documentation may also contain the keyword "Order." The occurrence of the keywords can be used to link different things (code, documentation, and so on) with the business concept called "Order."

The keywords are semantically related to the functionality of method and class names from the source code 110, and are typically terms that are widely used in what may be referred to as business language. Multiple methods and classes can be associated with any particular keyword. Similarly, a method or a class can be associated with multiple keywords. Using the dictionary of keywords 120, the entire source code 110 is annotated to produce annotated source code 130. The keywords are used as meta-information and the corresponding methods and classes in the annotated source code 130 are tagged with this meta-information. That is, this annotation can be a simple association of selected keywords with matching content.

A second step of annotation uses comments embedded in the source code (such as "Javadoc" comments in the case of the Java™ language) to extract keywords using common natural language processing techniques. The keywords extracted from the comments are then used to annotate the corresponding fragment of the code. In this case, the source code comments are therefore used as meta-information and the corresponding fragments of the source code are tagged with this meta-information.

Additional heuristics such as postfix-naming conventions used in some programming models (such as CmdImpl in J2EE, which implies a particular implementation of a command) can be used to augment the annotation.

Table 1 below presents original source code 110 that is used to develop an example that follows.

TABLE 1

```
public class Checkout extends Item {
/**
 * This method computes the total value of the items in the
 * shopping cart after any applicable discounts have been
applied
 * @param sc         The shopping cart being checked out
 * @throws IllegalArgumentException if cart does not exist
 */
    public void computeTotal (SC sc) throws
IllegalArgumentException {
        . . .
    }
}
```

Table 2 below presents a dictionary of keywords 120.

TABLE 2

| Keyword | Associated Classes and Methods |
|---|---|
| Shopping | Class Checkout, SC; Method Checkout.computeTotal |
| Shipping address | Class Checkout |
| Price reduction | Class Checkout, SC; Method Checkout.computeTotal |

Table 3 below presents annotated source code 130. Annotations appear between the token: /*///, and the token: */. These tokens can be anything suitable, but as used here allows annotated code to be compiled and executed in the usual manner.

TABLE 3

```
/*/// Shopping, Price reduction, Shipping address */
public class Checkout extends Item {
/**
 * This method computes the total value of the items in the
 * shopping cart after any applicable discounts have been
applied
 * @param sc         The shopping cart being checked out
 * @throws IllegalArgumentException if cart does not exist
 */
        /*/// Shopping, Price reduction */
        public void computeTotal (SC sc) throws
IllegalArgumentException {
            . . .
        }
}
```

The source code is summarized to derive a call graph 150. A call graph 150 is a directed graph that identifies static inter-relationships amongst classes and methods using nodes and directed edges. Given a call graph 150, a trace can be derived that identifies the flow of execution of some business logic.

The call graph 150 can be derived using suitable tools. One example is the JAN library, produced by the International Business Machines Corporation. The JAN library collects and manipulates the static information of a Java component (for example, application, applet, or servlet) by analyzing a set of class files and consequently producing a call graph 150. Any other suitable software tools can be used as an alternative.

Once the call graph 150 is derived, all classes and their corresponding methods that only reference other classes/methods and are not referred to by any classes/methods are identified. These classes and their methods serve as entry points or sources for all the derived workflows 160. Similarly, all classes and their corresponding methods that are only referred to by other classes/names and do not themselves reference other classes/methods are identified. These classes and their methods serve as the end points or sinks for all the derived workflows 160.

To derive one or more workflows 170, the user specifies a set of keywords that correspond to some business logic in which the user is interested. These user-supplied keywords may not be contained in the dictionary 120, though many words may be the same. The user keywords are used to search the annotated source code 130 and identify methods and classes that match the given keywords. Further, an external dictionary/ontology can also consulted to find synonyms of the user keywords, or words that are semantically related to the user keywords, to broaden the scope of the search.

One criterion that may be adopted for a match is to specify that the user keywords should either match the keywords embedded in the annotated source code, or should be present in a dictionary of synonyms.

Workflow Derivation

Given a set of keywords by a user, the annotated source code 130 is used to identify methods and classes that provide the closest match. As described earlier, the source code 110 can be annotated using artefacts such as method and class names, comments in the source code 110 or using a manually constructed dictionary of keywords 120.

A typical call graph 150 is represented as a tree where the nodes represent some fragment of the code (method or class depending on the granularity of the call graph 150). Arcs between the nodes represent static dependencies. Each method/class that matches the keywords is referred to as a matched node. Once the matching nodes are identified, the source code call graph 150 is used to determine traces that include the matched nodes.

The result of all the traces is a set of workflows 170. Each workflow includes one or more nodes from the results of the matching, and a node that is a source as well as a node that is a sink.

Examples of Workflow Derivation

Figure 2:
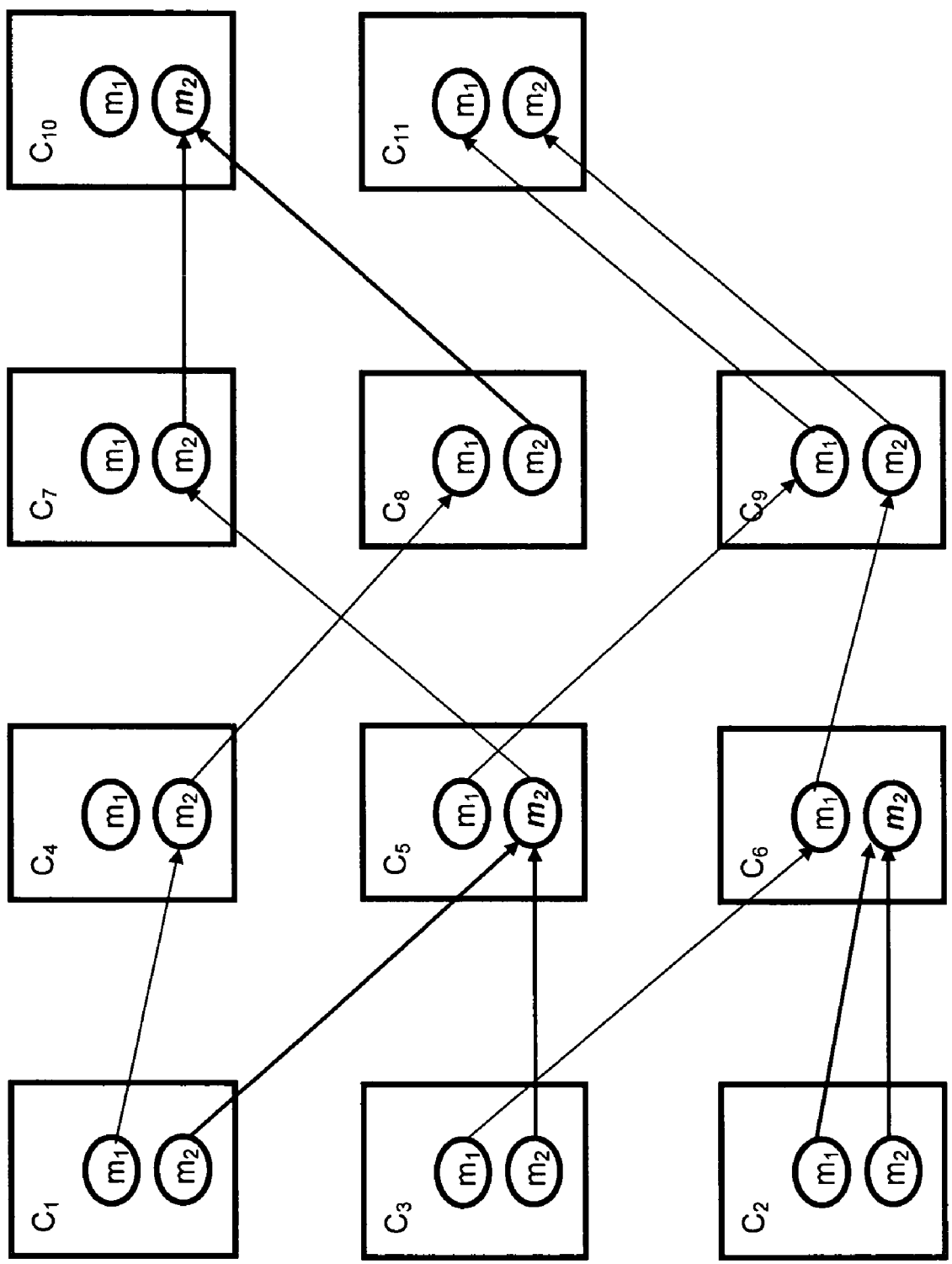
FIG. 2 is a schematic representation of traces used to derive workflows for a generic example.

FIG. 2 presents a generic example of a derived workflow from a source code call graph.

Each box represents a class and each oval inside the box represents a method of the class, referred to as a node. Directed edges indicate call graph dependencies between nodes.

FIG. 2 shows method $m_2$ of class $C_5$ (referred to as node $C_5.m_2$), method $m_2$ of class $C_6$ (referred to as node $C_6.m_2$), and method $m_2$ of class $C_{10}$ (referred to as node $C_{10}.m_2$) returned from the matching done based on some keywords (shown by filled blue ovals). Given these nodes, all workflows are derived that contain these nodes (shown in blue). All sources and sinks are identified such that a path from a source to the sink goes through the matched nodes. The algorithm tries to find paths that maximize the number of matched nodes within a path. Each found path corresponds to a workflow.

Table 4 below presents the example of FIG. 2, in which the result yields four workflows 170 that cover all the matched nodes. For the workflows identified in Table 1 below, nodes $C_1.m_2$, $C_2.m_2$, $C_3.m_1$, and $C_2.m_2$ are sources while $C_{10}.m_2$ is a sink.

TABLE 4

| | |
|---|---|
| 1. | $C_1.m_2 \rightarrow C_5.m_2 \rightarrow C_7.m_2 \rightarrow C_{10}.m_2$ |
| 2. | $C_2.m_2 \rightarrow C_5.m_2 \rightarrow C_7.m_2 \rightarrow C_{10}.m_2$ |
| 3. | $C_3.m_1 \rightarrow C_6.m_2 \rightarrow C_8.m_2 \rightarrow C_{10}.m_2$ |
| 4. | $C_3.m_2 \rightarrow C_6.m_2 \rightarrow C_8.m_2 \rightarrow C_{10}.m_2$ |

Figure 3:
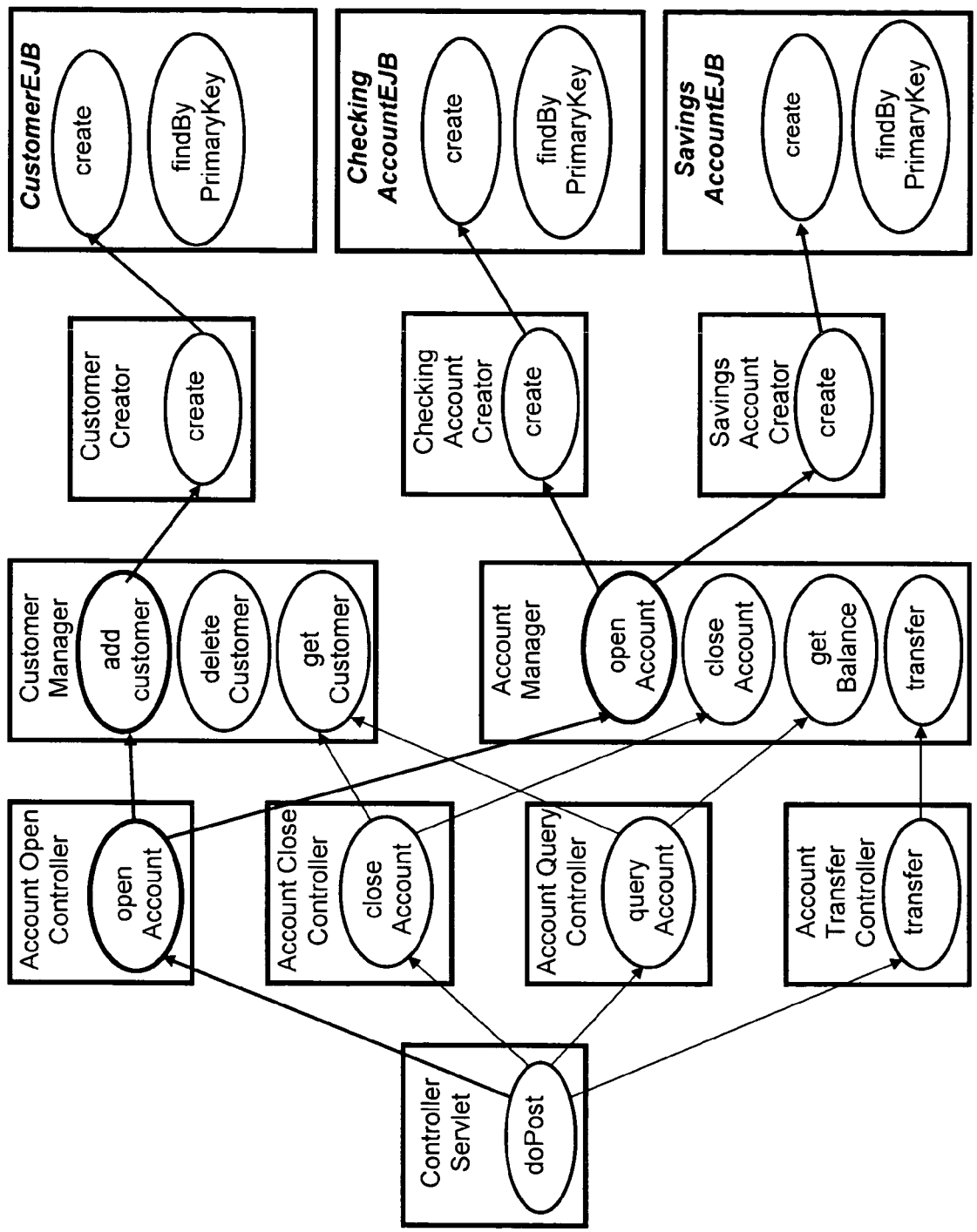
FIG. 3 is a schematic representation of traces used to derive workflows in a banking application.

FIG. 3 presents the example of a banking application that allows management of customer accounts. For the sake of brevity, not all classes and methods of the application are shown. The example considers a user attempting to customise or modify some part of the code relating to opening of a bank account. Accordingly, the user is interested in identifying workflows corresponding to the business logic of opening an account. The user in this instance provides user keywords as "open account".

Method openAccount of class AccountOpenController (referred to as node AccountOpenController.openAccount), and method openAccount of class AccountManager (referred to as node AccountManager.openAccount) are returned from the matching done based on the keywords (shaded). Given these nodes, all workflows are derived that contain these nodes (shaded). All sources and sinks are identified such that a path from a source to the sink goes through the matched nodes. As in the first example, the algorithm tries to find paths that maximize the number of matched nodes within a path. Each found path corresponds to a workflow.

Table 5 presents an example depicted in FIG. 3, in which the result yields the following three workflows that cover all the matched nodes.

TABLE 5

1. ControllerServlet.doPost→AccountOpenController.openAccount→ AccountManager.openAccount→CheckingAccountCreator.create→ CheckingAccountEJB.create
2. ControllerServlet.doPost→AccountOpenController.openAccount→ AccountManager.openAccount→SavingsAccountCreator.create→ SavingsAccountEJB.create
3. ControllerServlet.doPost→AccountOpenController.openAccount→ CustomerManager.addCustomer→CustomerCreator.create→ CustomerEJB.create In the workflows identified in Table 5 above, node ControllerServlet.doPost is a source while nodes CheckingAccountEJB.create, SavingsAccountEJB.create, and CustomerEJB.create are sinks.

Computer Hardware

Figure 4:
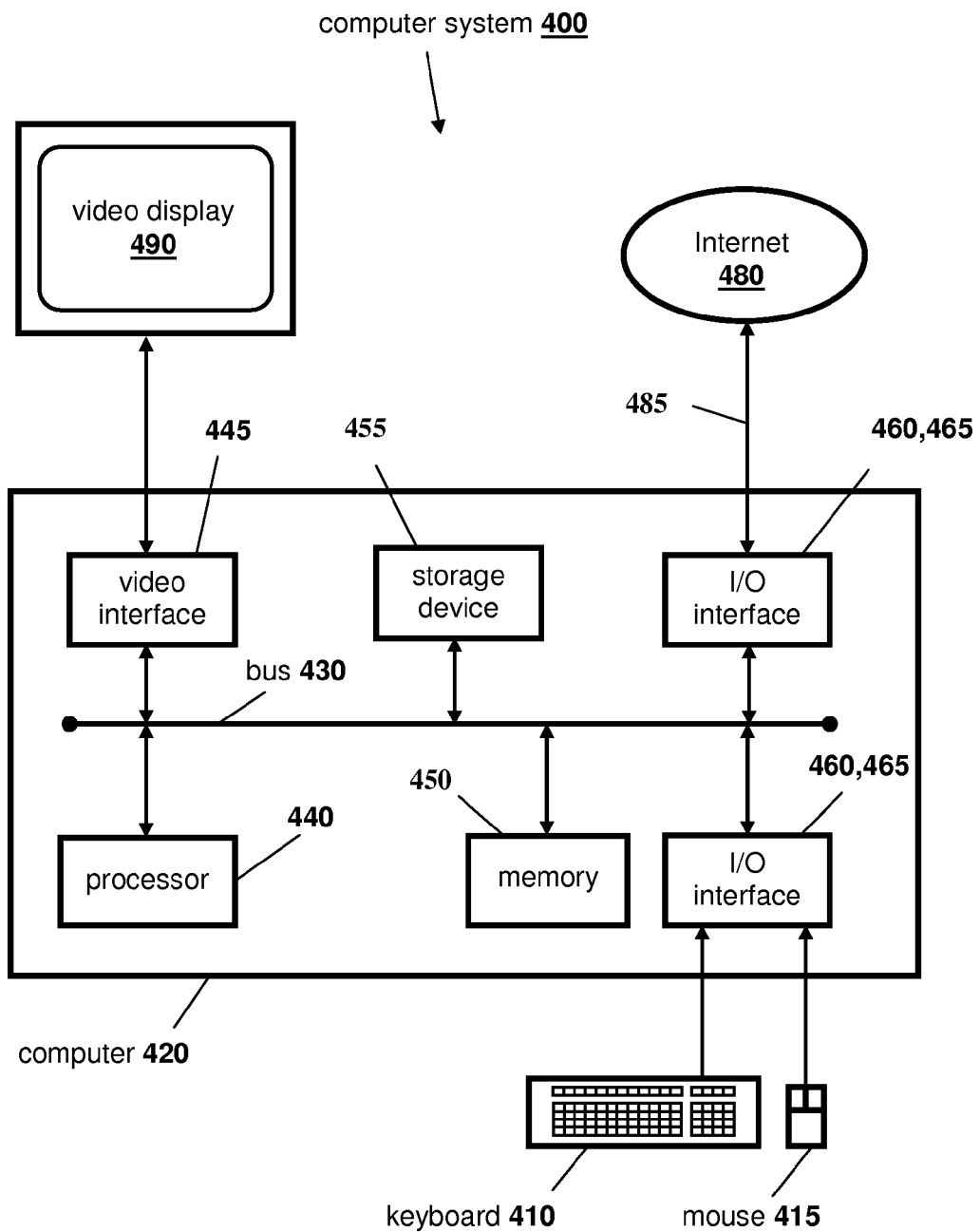
FIG. 4 is a schematic representation of a computer system suitable for performing the techniques described herein.

FIG. 4 is a schematic representation of a computer system 400 of a type that is suitable for executing computer software for mapping program source code to business logic. Computer software executes under a suitable operating system installed on the computer system 400, and may be thought of as comprising various software code means for achieving particular steps.

The components of the computer system 400 include a computer 420, a keyboard 410 and mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or any other suitable storage medium.

Each of the components of the computer 420 is connected to an internal bus 430 that includes data, address, and control buses, to allow components of the computer 420 to communicate with each other via the bus 430.

The computer system 400 can be connected to one or more other similar computers via a input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

Other configurations or types of computer systems can be equally well used to execute computer software that assists in implementing the techniques described herein.

CONCLUSION

Various alterations and modifications can be made to the techniques and arrangements described herein, as would be apparent to one skilled in the relevant art.

We claim
1. A computer-implemented method for mapping source code to a workflow, said method comprising:
annotating, by said computer, said source code, including comments within said source code, with keywords to provide annotated source code, wherein
said source code comprises methods and classes;
said keywords are semantically related to said methods and said classes of said source code;
said keywords represent a business requirement;
said source code is annotated with each of said keywords that match any of said methods or said classes of said source code; and
a code fragment of said source code is annotated with one or more of said keywords extracted from a comment corresponding to said code fragment;
generating, by said computer, a call graph of said source code, wherein:
said call graph represents one or more trees, each of said one or more trees having nodes; and
each of said nodes corresponding to a code fragment associated with a method or class;
inputting user-selected keywords into said computer;
determining, by said computer, matched nodes from each of said nodes matching one or more of said user-selected keywords;

using said call graph to determine, by said computer, all traces including any of said matched nodes,
wherein each of said traces corresponds to a workflow described by at least one of said user-selected keywords; and
identifying, by said computer, a workflow corresponding to that trace having a maximum number of said user-selected keywords that best represents a business requirement described by said user-selected keywords.

2. The method as claimed in claim 1, further comprising accessing a thesaurus to find synonyms to supplement said one or more user-selected keywords.

3. The method as claimed in claim 1, further comprising accessing an external dictionary to find semantically related words to supplement said one or more user-selected keywords.

4. The method as claimed in claim 1, wherein said workflow starts with an originating node, and ends with a terminating node.

5. The method as claimed in claim 1, wherein said workflow comprises an ordered list of user-selected keywords.

6. The method as claimed in claim 1, wherein said workflow comprises a directed path in said call graph.

7. The method as claimed in claim 1, further comprising storing a dictionary that associates said keywords with said modules of said source code.

8. The method as claimed in claim 1, wherein said keywords are words likely to match search terms.

9. A computer program storage medium readable by computer, tangibly embodying a program of instructions executable by said computer to perform a method for mapping program source code to a workflow, said method comprising:
annotating modules of source code, including comments within said source code, with keywords to provide annotated source code, wherein
said source code comprises methods and classes;
said keywords are semantically related to said methods and said classes of said source code;
said keywords represent a business requirement;
said source code is annotated with each of said keywords that match any of said methods or said classes of said source code; and
a code fragment of said source code is annotated with one or more of said keywords extracted from a comment corresponding to said code fragment;
generating a call graph of said source code, wherein:
said call graph represents one or more trees, each of said one or more trees having nodes; and
each of said nodes corresponding to a code fragment associated with a method or class;
inputting user-selected keywords;
determining matched nodes from each of said nodes matching one or more of said user-selected keywords;
using said call graph to determine all traces including any of said matched nodes,
wherein each of said traces corresponds to a workflow described by at least one of said user-selected keywords; and
identifying a workflow corresponding to that trace having a maximum number of said user-selected keywords that best represents a business requirement described by said user-selected keywords.

10. The computer program storage medium as claimed in claim 9, wherein said method further comprises accessing a thesaurus to find synonyms to supplement said one or more user-selected keywords.

11. The computer program storage medium as claimed in claim 9, comprising accessing an external dictionary to find semantically related words to supplement said one or more user-selected keywords.

12. The computer program storage medium as claimed in claim 9, wherein said workflow starts with an originating node, and ends with a terminating node.

13. The computer program storage medium as claimed in claim 9, wherein said workflow comprises an ordered list of user-selected keywords.

14. The computer program storage medium as claimed in claim 9, wherein said workflow comprises a directed path in said call graph.

15. The computer program storage medium as claimed in claim 9, wherein said method further comprises storing a dictionary that associates said keywords with said source code.

16. The computer program storage medium as claimed in claim 9, wherein said keywords are words likely to match search terms.

17. A computer system for mapping program source code to a workflow, said computer system comprising:
a memory that stores said source code and user-selected keywords; and
a processor configured to:
annotate said source code, including comments within said source code, with keywords to provide annotated source code, wherein
said source code comprises methods and classes;
said keywords are semantically related to said methods and said classes of said source code;
said keywords represent a business requirement;
said source code is annotated with each of said keywords that match any of said methods or said classes of said source code; and
a code fragment of said source code is annotated with one or more of said keywords extracted from a comment corresponding to said code fragment;
generate a call graph of said source code, wherein:
said call graph represents one or more trees, each of said one or more trees having nodes; and
each of said nodes corresponding to a code fragment associated with a method or class;
determine matched nodes from each of said nodes matching one or more of said user-selected keywords;
use said call graph to determine all traces including any of said matched nodes,
wherein each of said traces corresponds to a workflow described by at least one of said user-selected keywords; and
identify a workflow corresponding to that trace having a maximum number of said user-selected keywords that best represents a business requirement described by said user-selected keywords.

* * * * *

UNITED STATES PATENT AND TRADEMARK OFFICE
CERTIFICATE OF CORRECTION

| | | |
|---|---|---|
| PATENT NO. | : 7,640,532 B2 | Page 1 of 1 |
| APPLICATION NO. | : 10/925630 | |
| DATED | : December 29, 2009 | |
| INVENTOR(S) | : Jain et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Ninth Day of November, 2010

David J. Kappos
*Director of the United States Patent and Trademark Office*